June 23, 1936.　　C. J. HORNKOHL ET AL　　2,045,272
ICING MECHANISM
Filed Aug. 14, 1935　　2 Sheets-Sheet 2
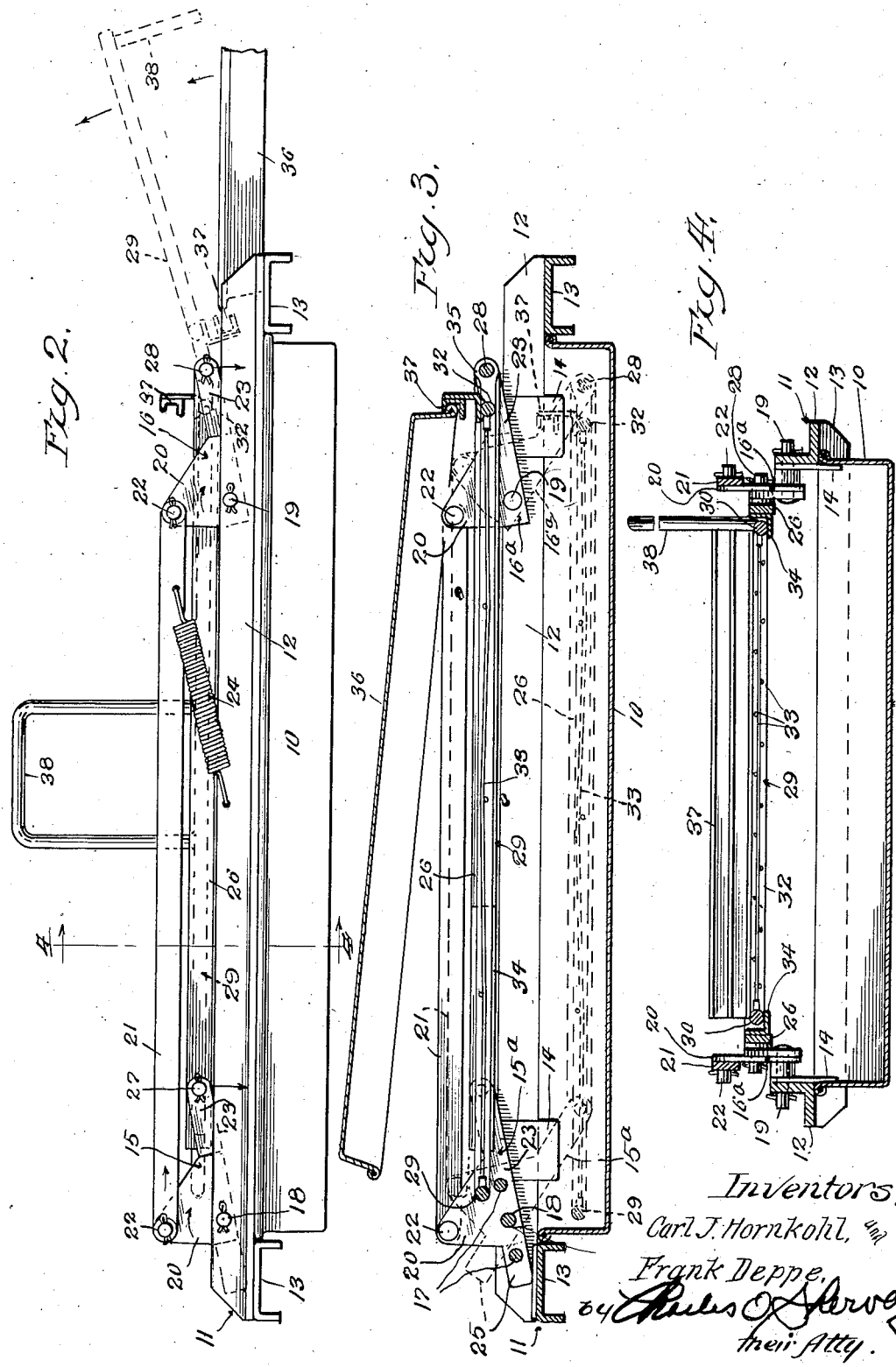

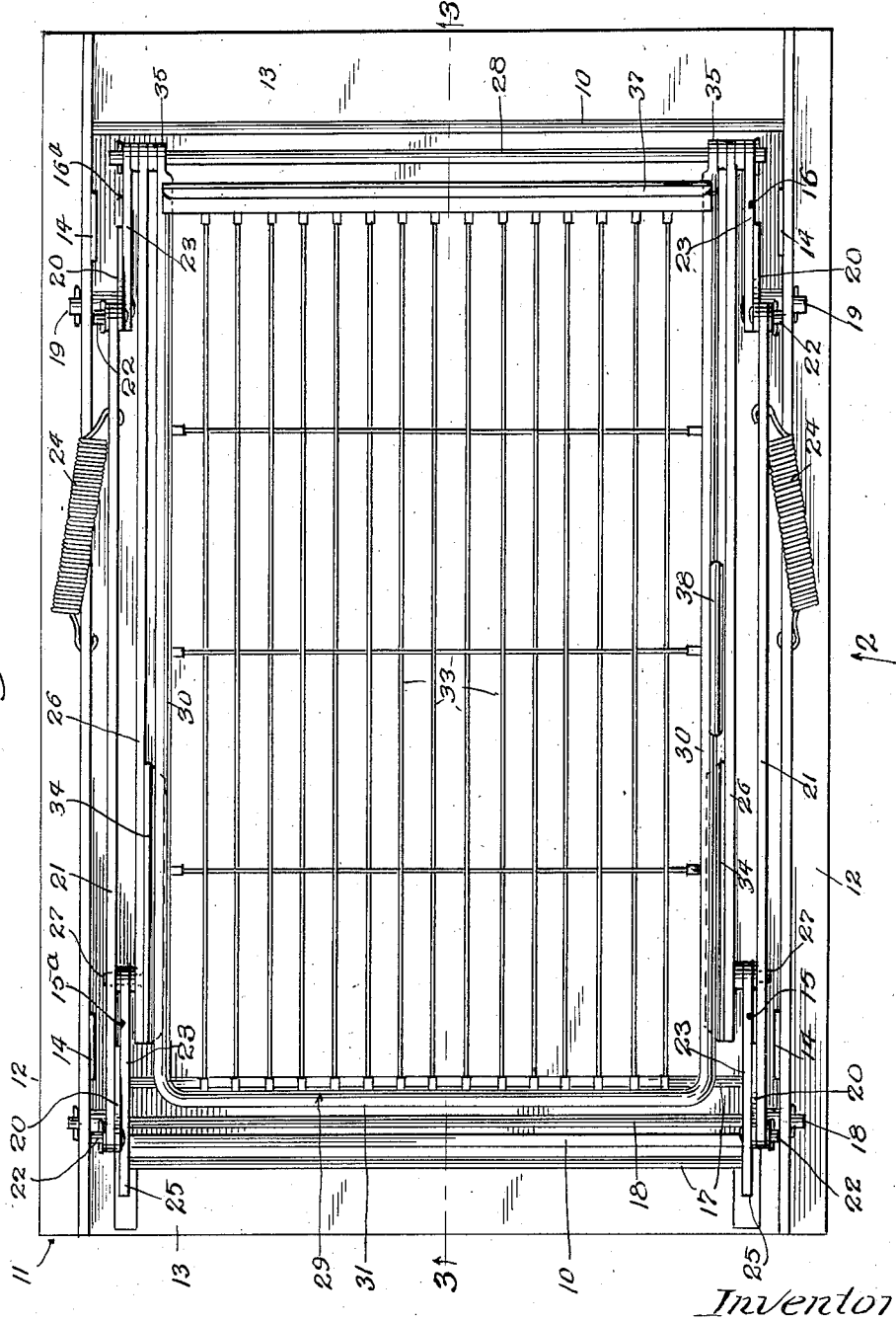

Patented June 23, 1936

2,045,272

UNITED STATES PATENT OFFICE 2,045,272

ICING MECHANISM

Carl J. Hornkohl and Frank Deppe, Chicago, Ill., assignors to Ackles-Hornkohl Company, Chicago, Ill., a corporation of Illinois Application August 14, 1935, Serial No. 36,101

8 Claims. (Cl. 91—4)

This invention relates to icing mechanism. Among the objects of this invention are to simplify and otherwise improve upon mechanism of this character.

The invention has reference more particularly to icing mechanism of that type which employs a depressible strainer-support and a strainer swingably mounted thereon and co-operating with a filled baking pan to invert the bakery goods contained in the pan over an icing pan, whereby the bakery goods may be dipped or partially dipped into the icing material contained in the pan.

Another object of this invention is to provide the drainer with a baking pan holder as a part thereof, whereby a baking pan may be supported at one end by the drainer and the other end may be manually held against the drainer during the inverting operation and the reinverting operation.

Another object is to provide novel parallel movement means whereby the drainer may be lowered into the icing pan while at all times maintaining a horizontal position so that all of the goods may be iced evenly.

Another object is to provide icing mechanism having an icing pan and a removable frame for carrying the operating mechanism and adapted to be placed upon the icing pan and removed therefrom at will.

Other objects and advantages will appear in the course of this specification, and with all of said objects and advantages in view, this invention consists in the several novel features hereinafter fully set forth and claimed.

One embodiment of the invention is clearly illustrated in the drawings accompanying this specification, in which:—

Fig. 1 is a plan of the icing mechanism;

Fig. 2 is a side elevation thereof looking toward the direction of the arrow 2 in Fig. 1;

Fig. 3 is a vertical, longitudinal section, taken on the line 3—3 of Fig. 1, and showing a baking pan held by the baking pan holder of the drainer; and Fig. 4 is a vertical cross-section, taken on the line 4—4 of Fig. 2.

Referring to said drawings, which are merely illustrative of one embodiment of the invention, the reference character 10 designates a rectangular icing pan having the usual bottom and sides and ends, the rims of which are reenforced by a curled edge or other flange. The pan is adapted to be supported upon a work bench, table or other support.

Removably supported upon the icing pan is a rectangular supporting frame 11, desirably composed of angle iron side frame members 12 and channel shaped end frame members 13, spotwelded or otherwise rigidly secured to the under sides of the side frame members at their ends. Lugs 14 are spot-welded or otherwise secured to the inner side of the side frame members and project down into the icing pan adjacent the inner faces of the sides thereof and prevent any lateral displacement of the frame upon the icing pan. The end frame members 13 project down along the ends of the icing pan and prevent endwise displacement of the frame.

Depressibly mounted on the supporting frame is a strainer support which will now be described. Fulcrumed on the side members of the frame are two pairs of bell crank levers 15, 15ª, 16, 16ª, those of one pair 15, 15ª being rigidly connected together, as by rods 17, 17, whereby the two levers move as a single unit. Desirably, the levers 15, 15ª are mounted upon a cross-rod 18 secured in the upright webs of the side frame members, and the levers 16, 16ª are fulcrumed upon said webs of the side frame members by pins or studs 19.

Corresponding arms 20 of each pair of bell crank levers are connected, as by pins 22, to corresponding arms of the other pair of bell crank members by connecting rods 21, thus providing parallel movement means whereby all of the bell crank members and parts carried thereby are moved in unison.

The other arms 23 of the bell crank members normally extend in slightly inclined directions and are capable of moving downwards into the icing pan from the position shown in solid lines in Figs. 2 and 3 to that shown in dotted lines in Fig. 3.

Coiled tension springs 24, the ends of which are connected respectively to the connecting rods 21 and to the webs of the side frame members 12, serve to retain the bell crank levers in their normal position. The springs act to move the connecting rods in a lengthwise direction, thereby swinging upward the arms 23 of the bell crank levers, and raising the drainer support and therewith the drainer.

Desirably the bell crank levers 15, 15ª have rearward extensions 25 that are arranged to strike against one end frame member so as to determine the normal position of the bell crank levers, the bars and the drainer.

Connecting the free ends of the arms 23 of one pair of bell crank members with the arms 23 of the other pair are drainer supporting bars 26.

Desirably pins 27 are employed to connect the drainer supporting bars 26 with the arms 23 of the bell crank levers 15, 15a, and a cross-rod 28 is employed to connect the other ends of said bars 26 with the corresponding arms 23 of the bell crank levers 16, 16a, said cross-rod extending from one side of the device to the other, as clearly seen in Fig. 1.

It will be apparent from the above that when the arms 23 of the bell crank levers are swung downwards, the drainer supporting bars will be lowered into the icing pan, at all times being maintained in horizontal position.

Swingably mounted upon the drainer support, as for instance upon the cross-rod 28, is a drainer 29 desirably composed of a rectangular frame consisting of a length of rod bent up to form side members 30 and one end 31. The other end of the drainer frame is formed by a rod 32 which extends between and is secured to ends of the side members 30 of the drainer frame. Wires 33 secured to and extending between the side and end members of the drainer frame complete the drainer. The drainer supporting bars 26 are provided at one end with angle iron bars 34 which form rests for the drainer to lie upon. The extremities of the side members 30 of the drainer frame are extended beyond the cross-rod 32 to form perforated ears 35 that surround the cross-rod 28, and form the pivotal connection between the drainer and rod 28. The drainer is movable from a horizontal position in which it is supported by the drainer supporting bars 26 to a position disposed beyond the end of the frame 11, as is indicated by the dotted lines in Fig. 2, and is moved into this position for the purpose of having a filled baking pan (illustrated at 36) attached to it prior to being inverted over the icing pan.

Conveniently, the pan holder may comprise a channel bar 37, welded or otherwise secured to the end frame rod 32, and located slightly above the drainer (when occupying the position seen in Fig. 3), but arranged to lie below the drainer when the latter is inverted and occupying the position seen in dotted lines in Fig. 2. In this position the usual wire edge or flange on the rim of the baking pan 36 can be inserted into the groove in the channel member 37, thereby connecting one end of the baking pan to the drainer. When inverting the baking pan, the free end of the latter is moved up against the drainer and the drainer and baking pan are then swung together over the icing pan, bringing the drainer to rest upon the angle iron bars 34 of the drainer supporting bars.

Conveniently, an upstanding handle 38 is secured to the side member of the drainer nearest the operator to facilitate the manipulation of the drainer.

In operation, the icing pan is partially filled with icing material and the mechanism is placed thereon. The handle 38 is then taken hold of and the drainer is swung into inverted position, as seen by dotted lines in Fig. 2. A baking pan 36 filled with bakery goods, which are to be iced, is then lifted into engagement with the channel member 37 and its free end brought up against the under side of the drainer, whereupon the drainer and baking pan are inverted together over the icing pan, bringing the drainer down upon the angle bars 34. The bakery goods are thereby inverted and fall upon the drainer. The baking pan is then swung upward slightly (see Fig. 3) and the handle 38 is taken hold of and the drainer is depressed into the icing material, bringing as much of the goods into the icing material as is required. Sometimes only the tops of the bakery goods are iced and in other cases the entire surfaces.

As soon as the pressure upon the handle is released, the springs 24 restore the drainer to normal position, thereby bringing the drainer with the goods thereon entirely above the icing pan. Thereafter the baking pan is lowered upon the drainer and the drainer with the baking pan held against the same are raised and reinverted, whereupon the iced bakery goods drop back into the baking pan and the latter may then be disconnected from the drainer and another filled pan operated on as before described.

More or less variation of the exact details of construction is possible without departing from the spirit of this invention. We desire, therefore, not to limit ourselves to the exact form of the construction shown and described, but intend, in the following claims to point out all of the invention disclosed herein.

We claim as new, and desire to secure by Letters Patent:

1. Icing mechanism comprising in combination an icing pan, a supporting frame removably supported on said icing pan and comprising side and end frame members and means to locate the frame upon the icing pan, a depressible drainer support having parallel movement supporting mechanism, pivotally mounted on the frame and a swingable and depressible drainer swingably mounted on the drainer support and having a baking pan holder thereon, whereby one end of a baking pan may be connected to the drainer.

2. Icing mechanism comprising in combination a rectangular icing pan, a supporting frame removably supported on said icing pan and comprising lengthwise extending frame members and crosswise extending frame members therebelow, and secured to the ends thereof, said supporting frame having downwardly extending lugs at the sides thereof co-operating with the end frame members to locate the supporting frame on the icing pan, a depressible drainer support having parallel movement supporting mechanism, pivotally mounted on the frame and a drainer swingably mounted on said drainer support.

3. Icing mechanism comprising in combination a supporting frame, a depressible drainer support having parallel movement supporting mechanism, pivotally mounted on the frame, yielding means for holding said drainer support in raised position and a combined drainer and baking pan holder swingably mounted on said drainer support, said baking pan holder supporting one end of the baking pan in spaced relation to the drainer.

4. Icing mechanism comprising in combination a frame, two pairs of bell crank levers fulcrumed thereon, parallel movement connections between said pairs of levers, a combined drainer and baking pan holder fulcrumed to one pair of levers, said baking pan holder supporting one end of the baking pan in spaced relation to the drainer and a support connected to said levers for supporting one end of the drainer when in horizontal position.

5. Icing mechanism comprising in combination a frame, two pairs of bell crank levers fulcrumed thereon, one pair of which is rigidly connected together, lengthwise movable connecting bars connecting corresponding arms of the levers of one pair with corresponding arms of the other pair, springs connected to said connecting bars, and stops for limiting the swinging movement of the levers in one direction, a combined drainer and baking pan holder fulcrumed to one pair of levers, said baking pan holder supporting one end of the baking pan in spaced relation to the drainer and a support connected to said levers and arranged to support the free end of the drainer when in horizontal position.

6. Icing mechanism comprising in combination a frame, two pairs of bell crank levers pivotally mounted on said frame and having arms arranged to swing downwards and upwards, a rigid connection between the two levers of one pair, a pair of connecting bars connecting corresponding arms of each pair of levers with corresponding arms of the other pair, springs connected to said connecting bars and frame for moving said bars in a lengthwise direction, a pair of drainer supporting bars connecting the downwardly swinging arms of each pair of levers with corresponding arms of the other pair, and a combined drainer and baking pan holder swingably connected to said drainer supporting bars, the baking pan holder serving to hold one end of a baking pan in spaced relation to the drainer, whereby the drainer, together with the baking pan may be inverted, and the drainer laid upon the drainer supporting bars, the latter, together with the drainer thereon, being capable of being depressed.

7. Icing mechanism comprising in combination an icing pan, a frame supported thereabove, two pairs of bell crank levers pivotally mounted on said frame and having arms arranged to swing downwards and upwards, a rigid connection between two levers of one pair, a pair of connecting bars connecting corresponding arms of each pair of levers with corresponding arms of the other pair, springs connected to said connecting bars and frame for moving said bars in a lengthwise direction, a pair of drainer supporting bars connecting the downwardly swinging arms of each pair of levers with corresponding arms of the other pair, and a combined drainer and baking pan holder swingably connected to said drainer supporting bars, the baking pan holder serving to hold one end of a baking pan in spaced relation to the drainer, whereby the drainer, together with the baking pan, may be inverted and the drainer laid upon the drainer supporting bars, the latter, together with the drainer thereon, being capable of being depressed into the icing pan.

8. Icing mechanism comprising in combination a frame, two pairs of levers fulcrumed thereon, one pair of which is rigidly connected together, lengthwise movable connecting bars connecting corresponding arms of the levers of one pair with corresponding arms of the other pair, springs connected to said connecting bars, and stops for limiting the swinging movement of the levers in one direction, supporting bars connecting other corresponding arms of one pair of levers to corresponding arms of the other pair of levers, and a swingable combined drainer and baking pan holder fulcrumed to said supporting arms, said baking pan holder supporting one end of the baking pan in spaced relation to the drainer.

CARL J. HORNKOHL.
FRANK DEPPE.